United States Patent
Amano et al.

(10) Patent No.: US 10,612,594 B2
(45) Date of Patent: Apr. 7, 2020

(54) MAIN BEARING FOR CRANKSHAFT OF INTERNAL COMBUSTION ENGINE

(71) Applicant: DAIDO METAL COMPANY LTD., Nagoya (JP)

(72) Inventors: Seiji Amano, Inuyama (JP); Shinichi Sakurai, Inuyama (JP)

(73) Assignee: DAIDO METAL COMPANY LTD., Nagoya (JP)

(*) Notice: Subject to any disclaimer, the term of this patent is extended or adjusted under 35 U.S.C. 154(b) by 0 days.

(21) Appl. No.: 16/142,345

(22) Filed: Sep. 26, 2018

(65) Prior Publication Data

US 2019/0128325 A1    May 2, 2019

(30) Foreign Application Priority Data

Oct. 26, 2017  (JP) .................................. 2017-207241

(51) Int. Cl.
  *F16C 33/10*  (2006.01)
  *F16C 9/02*   (2006.01)
  (Continued)

(52) U.S. Cl.
  CPC ............ *F16C 33/1065* (2013.01); *F16C 9/02* (2013.01); *F16C 17/022* (2013.01); *F16C 9/04* (2013.01); *F16C 2360/22* (2013.01)

(58) Field of Classification Search
  CPC .. F16C 9/02; F16C 9/04; F16C 17/022; F16C 33/046; F16C 33/1065
  See application file for complete search history.

(56) References Cited

U.S. PATENT DOCUMENTS 2,965,419 A    12/1960  Lowe
4,105,267 A *  8/1978   Mori .................... F16C 33/1065
                                                           384/291
(Continued)

FOREIGN PATENT DOCUMENTS

JP    H04-219521 A    8/1992
JP    H05-202936 A    8/1993
(Continued)

OTHER PUBLICATIONS

Extended European Search Report issued in corresponding EP Application No. 18202632.8, dated Mar. 7, 2019, 8 pages.
(Continued)

*Primary Examiner* — James Pilkington
(74) *Attorney, Agent, or Firm* — Snyder, Clark, Lesch & Chung, LLP

(57) ABSTRACT

A main bearing for a journal portion of a crankshaft includes a pair of upper and lower half bearings forming a cylindrical shape. Each half bearing includes a main cylindrical portion including a circumferentially central portion and having a slide surface, and crush reliefs formed on both circumferential sides of the slide surface. Only the upper half bearing includes an oil groove on its inner peripheral surface, and an oil hole pierced from the oil groove to an outer peripheral surface. The lower half bearing includes an axial groove on the slide surface that is arranged apart from the circumferentially central portion toward the forward side by a circumferential angle of 10° or more, and apart from the crush relief located on the forward side by a circumferential angle of 10° or more.

8 Claims, 10 Drawing Sheets

(51) Int. Cl.
*F16C 17/02* (2006.01)
*F16C 9/04* (2006.01)

(56) References Cited

U.S. PATENT DOCUMENTS 8,708,566 B2 * 4/2014 Otsuki ..................... F16C 9/02
                                                        384/288
9,341,211 B2 * 5/2016 Aubele ..................... F16C 9/04

FOREIGN PATENT DOCUMENTS

| JP | H08-277831 A | 10/1996 |
| JP | H09-504356 A | 4/1997 |
| JP | 2005-069283 A | 3/2005 |

OTHER PUBLICATIONS

Office Action issued in corresponding Korean Application No. 10-2018-0127251 dated Jun. 20, 2019, 6 pages.

* cited by examiner

MAIN BEARING FOR CRANKSHAFT OF INTERNAL COMBUSTION ENGINE

BACKGROUND OF THE INVENTION

(1) Field of the Invention

The present invention relates to a main bearing, and particularly to a main bearing for a crankshaft of an internal combustion engine that bears a journal portion of the crankshaft, and is configured so that lubricating oil supplied to an inner peripheral surface of the main bearing is supplied, through an internal lubricating oil path of the crankshaft, to an inner peripheral surface of a connecting rod bearing which bears a crankpin.

(2) Description of Related Art

A crankshaft of an internal combustion engine is, at a journal portion thereof, borne by a cylinder block bottom part of the internal combustion engine via a main bearing composed of a pair of half bearings. For the main bearing, lubricating oil discharged by an oil pump is fed into a lubricating oil groove formed along an inner peripheral surface of the main bearing, from an oil gallery formed in a cylinder block wall through a through-hole (oil hole) formed in a wall of the main bearing. Moreover, a first lubricating oil path is formed to pierce through the journal portion in its radial direction, and openings formed at both ends of the first lubricating oil path communicate with the lubricating oil groove of the main bearing. Further, a second lubricating oil path passing through a crank arm portion is formed so as to branch from the first lubricating oil path of the journal portion, and the second lubricating oil path communicates with a third lubricating oil path formed to pierce through the crankpin in its radial direction. In this way, the lubricating oil fed into the lubricating oil groove formed on the inner peripheral surface of the main bearing from the oil gallery in the cylinder block wall through the through-hole is supplied between the crankpin and a slide surface of a connecting rod bearing from a discharge opening which opens at the end of the third lubricating oil path, through the first lubricating oil path, the second lubricating oil path, and the third lubricating oil path (e.g., see JP H08-277831 A).

Conventionally, a slide bearing composed of a pair of half bearings has been employed as a main bearing and a connecting rod bearing. In the slide bearing, a so-called crush relief is formed adjacent to abutment surfaces of the half bearings.

The crush relief is a wall thickness reduced region in which a wall thickness of the region adjacent to a circumferential end surface of a half bearing is formed so as to decrease toward the circumferential end surface. The crush relief is formed with the intention of absorbing displacement and deformation of the abutment surfaces of the half bearings in the state where the pair of half bearings are mounted (e.g., see JP H04-219521 A).

BRIEF SUMMARY OF THE INVENTION

In recent years, higher-speed rotation of a crankshaft has been required for an internal combustion engine in order to increase output. However, during operation with high-speed rotation of the crankshaft of the internal combustion engine, at the moment when an entrance opening for oil in an outer peripheral surface of a journal portion of a lubricating oil path in a cylindrical barrel portion of the journal portion starts to communicate with a crush relief after a state where the entrance opening is blocked by a slide surface of a half bearing of a main bearing, high-pressure oil in an internal lubricating oil path of the journal portion is jetted from the entrance opening to a clearance between the crush relief of the half bearing and the surface of the journal portion, turbulent flow is thereby generated, and a frictional loss is caused.

Specifically, the main bearing bears dynamic load of the journal portion of the crankshaft by generating pressure in oil between a slide surface of the main bearing and the surface of the journal portion.

During the operation of the internal combustion engine, the degree of a load on the slide surface of the main bearing and the direction of the load always fluctuate, and the central axis of the journal portion moves while decentering relative to a bearing central axis of the main bearing so as to generate oil film pressure which balances with the load. Thus, the main bearing always changes in bearing clearance (clearance between the surface of the journal portion and the slide surface) at any position of the slide surface.

In a four-cycle internal combustion engine, a load on a main bearing is maximized in a combustion stroke. At this point, as shown in FIG. 15, in the main bearing 14 composed of half bearings 141 and 142, a journal portion 6 moves in a direction (arrow M) toward a slide surface 7 in the vicinity of a circumferentially central portion C of the half bearing 142 on the lower side of the drawing, and the surface of the journal portion 6 comes closest to the slide surface 7 in the vicinity of the circumferentially central portion C of the lower half bearing 142. Consequently, oil in a clearance (bearing clearance) between the slide surface 7 in the vicinity of the circumferentially central portion C of the half bearing 142 and the surface of the journal portion 6 becomes extremely high in pressure under the load.

It should be noted that the half bearing 142 on the lower side of the drawing shown in FIG. 15 is a half bearing to be combined with a bearing cap 82 in a cylinder block bottom part shown in FIG. 1.

As shown in FIG. 16, during the rotation of the journal portion 6 in an X-direction, the clearance between the surface of the journal portion 6 and the slide surface 7 of a main cylindrical portion 72 of the half bearing 142 is narrow while an entrance opening 6c for oil formed on an outer peripheral surface is located above the slide surface 7 of the main cylindrical portion 72 of the half bearing 142 on the lower side of the drawing. Therefore, the amount of oil flowing out from the entrance opening 6c is small, and the pressure of oil in a lubricating oil path 6a is in a high state. Particularly during operation with high-speed rotation of the crankshaft of the internal combustion engine, an effect by centrifugal force on the oil in the lubricating oil path 6a increases, and the pressure of oil near the entrance opening 6c in the lubricating oil path 6a increases.

As shown in FIG. 17, at the moment when communication between the entrance opening 6c of the lubricating oil path 6a on the surface of the journal portion 6 and a crush relief 70 is started, jet flow (F11) is instantaneously formed from the lubricating oil path 6a toward a relief clearance due to the difference in pressure between the oil in the lubricating oil path 6a and the oil in the clearance (relief clearance) between the crush relief 70 and the surface of the journal portion 6, and therefore the turbulent flow is generated. The generation of such turbulent flow causes the frictional loss described above.

Therefore, an object of the present invention is to provide a main bearing for a crankshaft of an internal combustion engine that enables a frictional loss resulting from the above-described jet flow to be reduced during the operation of the internal combustion engine.

According to the present invention, there is provided a main bearing which rotatably supports a journal portion of a crankshaft of an internal combustion engine, the journal portion including a cylindrical barrel portion, a lubricating oil path extending through the cylindrical barrel portion, and at least one entrance opening of the lubricating oil path formed on an outer peripheral surface of the cylindrical barrel portion, wherein the main bearing includes a pair of upper and lower half bearings which are combined with each other to form a cylindrical shape, only the upper half bearing of the pair of half bearings has an oil groove formed on an inner peripheral surface thereof and extending in a circumferential direction, and at least one oil hole extending from the oil groove to an outer peripheral surface of the upper half bearing through the upper half bearing, each of the half bearings has a main cylindrical portion including a circumferentially central portion (circumferentially central section) of the half bearing, the main cylindrical portion has a slide surface on a radially inner side thereof, and each of the half bearings also has crush reliefs formed on both circumferential sides of the slide surface so that a wall thickness at the crush relief is smaller than that of the main cylindrical portion, and the lower half bearing has an axial groove extending in an axial direction on the slide surface between the circumferentially central portion of the half bearing and the crush relief on a rotation direction forward side of the journal portion, and the axial groove is arranged apart from the circumferentially central portion of the half bearing toward the rotation direction forward side by a circumferential angle of 10° or more, and apart from the crush relief on the rotation direction forward side of the journal portion by a circumferential angle of 10° or more.

According to the present invention, a depth (D1) of the axial groove measured from the slide surface in a radial direction may be 0.5 to 30 μm.

Furthermore, the axial groove may have a circumferential length corresponding to a circumferential angle of 1 to 35°.

Moreover, the axial groove may open at both axial ends of the lower half bearing.

Alternatively, the axial groove may not open at either axial end of the lower half bearing.

Furthermore, according to the present invention, the lower half bearing may include a plurality of axial grooves, and in that case, the plurality of axial grooves can be formed within a circumferential range of a circumferential angle of 5 to 35°.

Moreover, the lower half bearing described above can also have an axial groove symmetrical to the above described axial groove with respect to the circumferentially central portion, on the slide surface between the circumferentially central portion and the crush relief located on a backward side in a rotation direction of the journal portion.

DETAILED DESCRIPTION OF THE INVENTION

Figure 1:
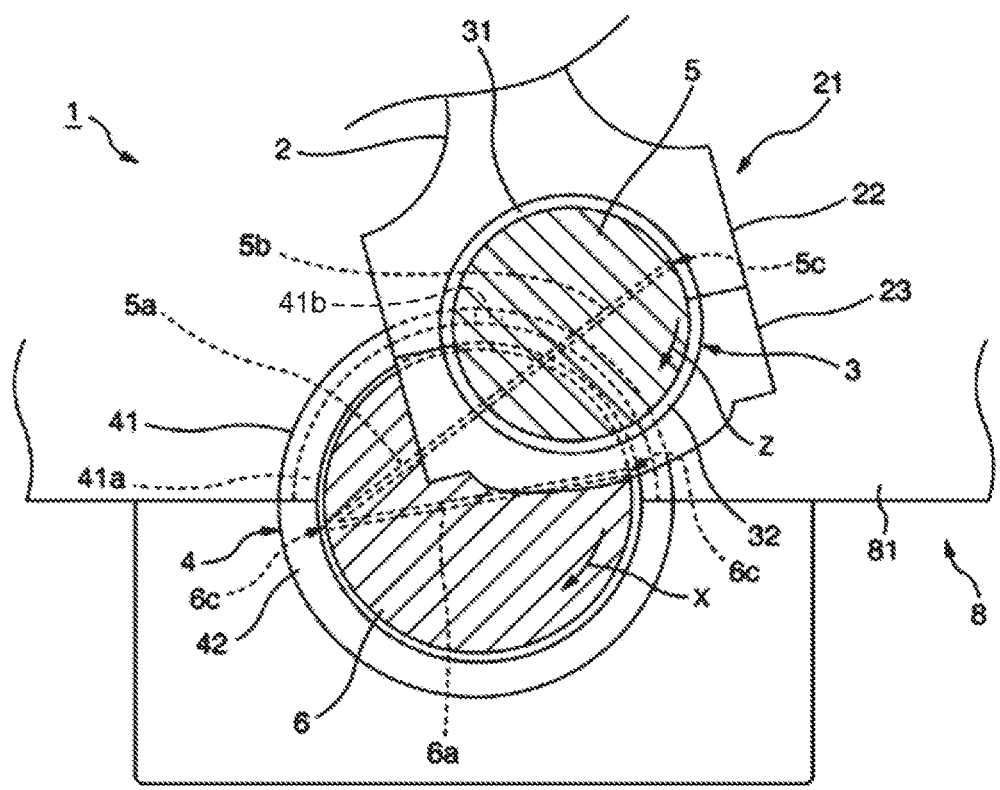
FIG. 1 is a sectional view in which a crankshaft of an internal combustion engine is cut in a journal portion and a crankpin portion.

Hereinafter, embodiments of the present invention will be described with reference to the drawings. It should be noted that an axial groove and a crush relief are drawn in an exaggerated manner in the drawings to make it easier to understand.

Embodiment 1

(Overall Configuration of Bearing Device)

As shown in FIG. 1, a bearing device 1 according to the present embodiment includes a journal portion 6 borne at a bottom part of a cylinder block 8, a crankpin 5 which is formed integrally with the journal portion 6 and thus rotates around the journal portion 6, and a connecting rod 2 which transmits reciprocating movement to the crankpin 5 from an internal combustion engine. As slide bearings for bearing a crankshaft, the bearing device 1 further includes a main bearing 4 which rotatably bears the journal portion 6, and a connecting rod bearing 3 which rotatably bears the crankpin 5.

It should be noted that the crankshaft includes a plurality of journal portions 6 and a plurality of crankpins 5, however, for convenience of explanation, one journal portion 6 and one crankpin 5 are shown in the drawings and described accordingly. In FIG. 1, regarding the positional relation in the depth direction of the drawing, the journal portion 6 is on a far side of the drawing, and the crankpin 5 is on a near side of the drawing.

The journal portion 6 is supported by a cylinder block bottom part 81 of the internal combustion engine via the main bearing 4 composed of a pair of half bearings 41, 42. In the half bearing 41 on an upper side in FIG. 1, an oil hole 41b is formed to be pierced through a wall between an outer peripheral surface and an inner peripheral surface, and a lubricating oil groove 41a is formed to extend over the entire length of the inner peripheral surface. Moreover, the journal portion 6 has a lubricating oil path 6a pierced in its radial direction. If the journal portion 6 rotates in an arrow X direction, both end openings (entrance openings) 6c of the lubricating oil path 6a alternately communicate with the lubricating oil groove 41a of the main bearing 4.

The crankpin 5 is supported by a large end housing 21 (a rod side large end housing 22 and a cap side large end housing 23) of the connecting rod 2 via the connecting rod bearing 3 composed of a pair of half bearings 31 and 32.

As described above, lubricating oil discharged to the main bearing 4 by an oil pump is fed into the lubricating oil groove 41a formed along the inner peripheral surface of the upper half bearing 41, from an oil gallery formed in a cylinder block wall through the oil hole 41b formed in a wall of the upper half bearing 41 of the main bearing 4.

Furthermore, the first lubricating oil path 6a is formed to penetrate through the journal portion 6 in the radial direction, and the entrance openings 6c of the first lubricating oil path 6a communicate with the lubricating oil groove 41a. Further, a second lubricating oil path 5a passing through a crank arm portion (not shown) is formed so as to branch from the first lubricating oil path 6a of the journal portion 6, and the second lubricating oil path 5a communicates with a third lubricating oil path 5b formed to penetrate through the crankpin 5 in the radial direction of.

In this way, the lubricating oil is supplied into a clearance formed between the crankpin 5 and the connecting rod bearing 3 from the discharge opening 5c at the end of the third lubricating oil path 5b through the first lubricating oil path 6a, the second lubricating oil path 5a, and the third lubricating oil path 5b.

(Configuration of Main Bearing)

Figure 6:
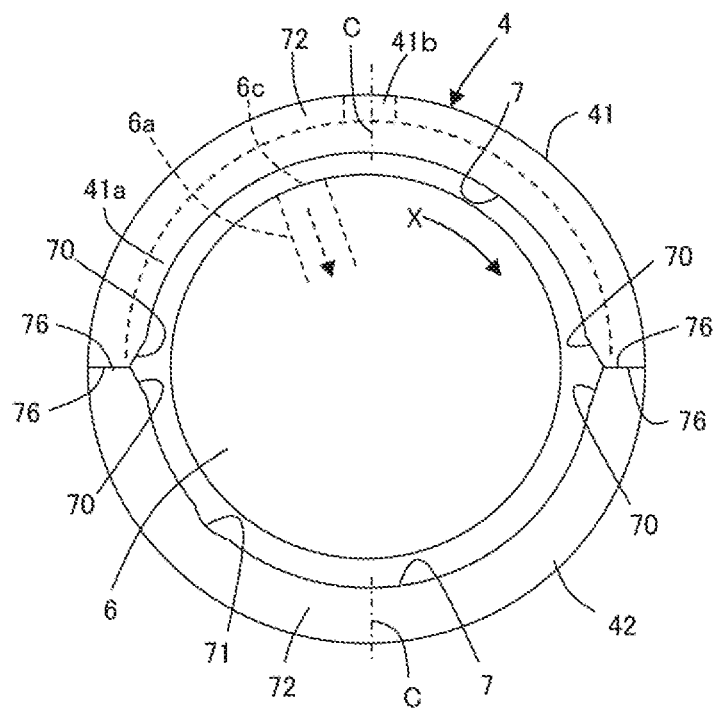
FIG. 6 is a view in which the main bearing and the journal portion according to the first embodiment of the present invention are seen from the axial direction.

Moreover, the main bearing 4 according to the present embodiment is formed by bringing circumferential end surfaces 76 of the pair of half bearings 41, 42 into abutment with each other and thus combining the pair of half bearings 41, 42 into a cylindrical shape as a whole (see FIG. 6). The half bearing 41, 42 has a slide layer including a Cu bearing alloy or an Al bearing alloy, or has a back metal layer made of an Fe alloy and a slide layer including a Cu bearing alloy or an Al bearing alloy. In addition, the slide layer may have, on a surface side (including an inner surface of an axial groove 71 described later) serving as the slide surface 7, a surface portion including one element selected from the group consisting of Bi, Sn, and Pb softer than a bearing alloy, a surface portion consisting of an alloy mainly containing the above metals, or a surface portion consisting of a resin composition mainly containing synthetic resin. How- ever, it is preferable that the inner surface of the axial groove 71 does not have these surface portions. This is because, when oil contains a large number of foreign matters, the foreign matters tend to be embedded or accumulated in the soft surface portion serving as the inner surface of the axial groove 71. If the foreign matters are embedded or accumulated in the inner surface of the axial groove 71, turbulent flow tends to be generated in oil flowing in the axial groove 71.

The half bearing 41, 42 has the main cylindrical portion 72 including a circumferentially central portion C, and the slide surface 7 is formed on a radially inner side of the main cylindrical portion 72. Moreover, crush reliefs 70, 70 are formed on both circumferential sides of the slide surface 7. Therefore, in the present invention, the inner peripheral surface of the half bearing 41, 42 include the slide surface 7 and the crush reliefs 70, 70.

Figure 2:
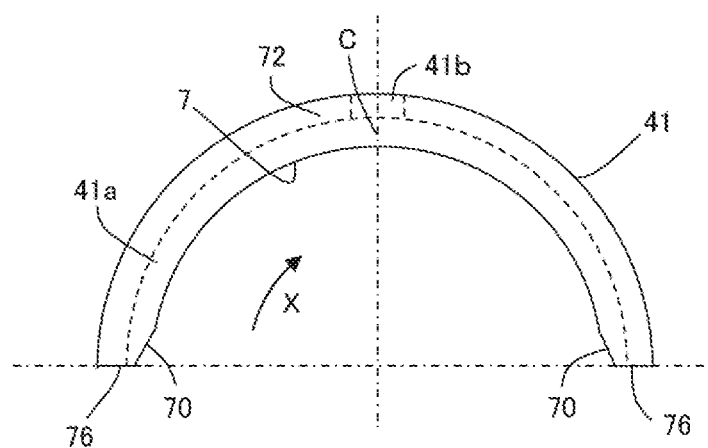
FIG. 2 is a view in which an upper half bearing of a main bearing according to a first embodiment of the present invention is seen from an axial direction.
Figure 3:
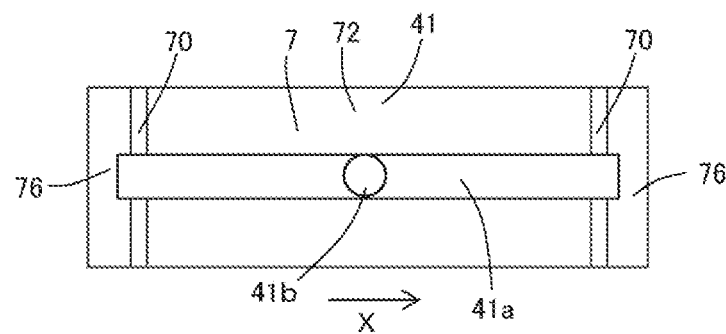
FIG. 3 is a plan view in which the half bearing shown in FIG. 2 is seen from a slide surface side.
Figure 4:
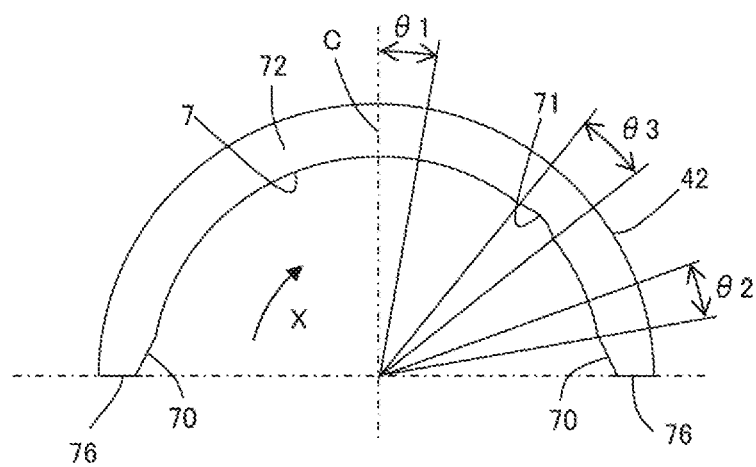
FIG. 4 is a view in which a lower half bearing according to the first embodiment of the present invention is seen from the axial direction.
Figure 5:
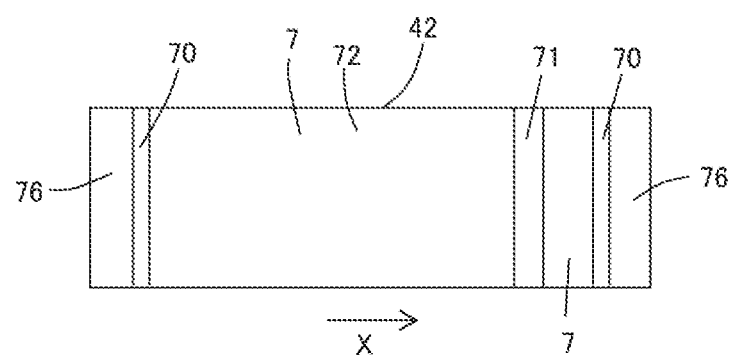
FIG. 5 is a plan view in which the half bearing shown in FIG. 4 is seen from a slide surface side.

FIG. 2 shows a view in which the upper half bearing 41 which bears the journal portion 6 shown in FIG. 1 is seen from the axial direction. FIG. 3 shows a plan view in which the upper half bearing 41 is seen from the slide surface side. FIG. 4 shows a view in which the lower half bearing 42 which bears the journal portion 6 shown in FIG. 1 is seen from the axial direction. FIG. 5 shows a plan view in which the lower half bearing 42 is seen from the slide surface side. FIG. 6 shows a view in which the main bearing 4 which bears the journal portion 6 shown in FIG. 1 are seen from the axial direction.

As shown in FIGS. 2 to 6, the crush relief 70 means a surface formed by reducing the wall thickness of the half bearing 41, 42 from the original slide surface 7 in the radial direction in a circumferential end region of the upper or lower half bearing 41, 42. This surface is formed to absorb, for example, displacement and deformation of the circumferential end surface 76 of the half bearing 41, 42 that may be caused when the pair of half bearings 41, 42 are mounted in a bearing holding hole of the cylinder block bottom part 8. Therefore, a curvature center position of the surface of the crush relief 70 is different from a curvature center position of another region (the slide surface 7) (see SAE J506 (item 3.26 and item 6.4), DIN1497, section 3.2, and JIS D3102). In general, in the case of a bearing for a small-size internal combustion engine for a passenger vehicle, the depth of the crush relief 70 at the circumferential end surface 76 of the half bearing (a distance from the original slide surface 7 to the crush relief 70 in the circumferential end surface 76) is approximately 0.01 to 0.05 mm.

It should be noted that the bearing wall thickness (bearing wall thickness excluding the region where the crush relief 70 is formed, i.e., wall thickness of the main cylindrical portion 72) of the upper or lower half bearing 41, 42 is constant in the circumferential direction. However, the bearing wall thickness of the half bearing 41, 42 is not limited thereto, but may be maximized in the circumferentially central portion C, and continuously decrease toward both circumferential end surfaces 76.

In Embodiment 1, the upper half bearing 41 has, on an inner peripheral surface thereof, the oil groove 41a formed over the entire length in the circumferential direction. In Embodiment 1, the depth of the oil groove 41a and the axial length of the oil groove 41a (the width of the oil groove 41a) are substantially constant or the same dimensions in the circumferential direction of the upper half bearing 41. When the diameter of the journal portion 6 of the crankshaft of the small-size internal combustion engine is 40 to 100 mm, the depth of the oil groove 41a is approximately 1 mm to 2.5 mm. The larger the diameter of the journal portion 6 is, the greater the depth of the oil groove 41*a* is.

It should be noted that, differently from the present embodiment, the oil groove 41*a* may be modified so that both circumferential ends of the oil groove 41*a* are located in the crush relief 70. Alternatively, one of the circumferential ends of the oil groove 41*a* may be located in the crush relief 70, and the other may be located in the circumferential end surface 76 of the upper half bearing 41. Moreover, the axial length of the oil groove 41*a* may be maximized in the vicinity of the circumferentially central portion of the oil groove 41*a*, and decrease toward both circumferential end surfaces of the oil groove 41*a*. Further, the depth of the oil groove 41*a* may be maximized in the vicinity of the circumferentially central portion of the oil groove 41*a*, and decrease toward both circumferential end surfaces of the oil groove 41*a*.

Furthermore, the oil hole 41*b* is formed in the oil groove 41*a* to penetrate through the wall of the upper half bearing 41. In the present embodiment, one oil hole 41*b* is formed at the position of the circumferentially central portion and an axially central portion C of the upper half bearing 41. The diameter of the entrance opening 6*c* of the lubricating oil path 6*a* at the surface of the journal portion 6 is approximately 3 to 8 mm in general, and the axial length of the oil groove 41*a* is set to a dimension slightly larger than the diameter of the entrance opening 6*c* of the lubricating oil path 6*a*. Moreover, when an opening of the oil hole 41*b* is circular as in Embodiment 1, the diameter of the opening has the same dimension as the axial length of the oil groove 41G. It should be noted that the dimension of the opening of the oil hole 41*b*, the shape of the opening, the formed position of the oil hole 41*b*, and the number of the formed oil holes 41*b* are not limited to those of the present embodiment.

As will be described below in detail, the lower half bearing 42 has the same dimension and shape as the upper half bearing 41 except that the lower half bearing 42 has the configuration of the axial groove 71 and does not have the configurations of the oil groove 41*a* and the oil hole 41*b*.

The lower half bearing 42 has the axial groove 71 on the slide surface 7 of the main cylindrical portion 72 between the circumferentially central portion C of the half bearing and the crush relief 70 located on a forward side in a rotation direction X of the journal portion 6.

In the present embodiment, the axial groove 71 is formed on the slide surface 7 only within a region apart from the circumferentially central portion C of the lower half bearing 42 by a circumferential angle (θ1) angle of 10° or more, and apart from the crush relief 70 located on the forward side in the rotation direction X of the journal portion toward the circumferentially central portion by a circumferential angle (θ2) of 10° or more. Further, it is preferable that the axial groove 71 is apart from the circumferentially central portion C of the lower half bearing 42 by a circumferential angle (θ1) of 15° or more. Moreover, it is preferable that the axial groove 71 is apart from the crush relief 70 located on the forward side in the rotation direction X of the journal portion of the lower half bearing 42 toward the circumferentially central portion by a circumferential angle (θ2) of 15° or more.

Incidentally, the journal portion 6 of the crankshaft of the internal combustion engine rotates in one direction during operation. Thus, a person skilled in the art will be able to appreciate which of the two crush reliefs 70, 70 adjacent to both circumferential end surfaces 76, 76 of the lower half bearing 42 corresponds to the "crush relief located on the forward side in the rotation direction of the journal portion", in consideration of the rotation direction of the journal portion 6 of the crankshaft. Moreover, a person skilled in the art is able to design and manufacture the main bearing 4 according to the present embodiment under the disclosure of the present invention, and suitably mount the main bearing 4 in the cylinder block bottom part 8 so as to bear the journal portion of the crankshaft which rotates in one direction.

Figure 7:
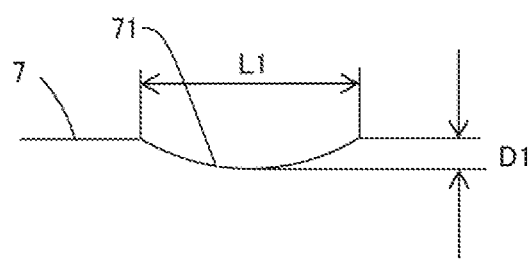
FIG. 7 is a sectional view of an axial groove formed on a slide surface of the half bearing.

FIG. 7 shows a section of the axial groove 71 perpendicular to the axial direction of the lower half bearing 42. The section of the axial groove 71 has an arc-shape. It should be noted that the sectional shape of the axial groove 71 may be changed to a sectional shape such as a rectangle or an inverted trapezoid.

A depth D1 of the axial groove 71 from the slide surface 7 in the radial direction can be 0.5 to 30 μm. The depth D1 of the axial groove 71 is preferably 20 μm or less, and still preferably 10 μm or less. Moreover, a circumferential length L1 of the axial groove 71 is preferably a length equivalent to a circumferential angle (θ3) of 1 to 35° on the slide surface 7 of the lower half bearing 42 and still preferably a length equivalent to a circumferential angle (θ3) of 1 to 20°.

In the present embodiment, the depth D1 and the circumferential length L1 of the axial groove 71 are constant along the axial direction of the lower half bearing 42, but the depth D1 and the circumferential length L1 may be changed in the axial direction.

In the present embodiment, the circumferential length L1 of the axial groove 71 is a length equivalent to a circumferential angle (θ3) of 10°, and the axial groove 71 is formed so that the center of the circumferential length L1 is located at a circumferential angle of 45° from the circumferentially central portion C of the lower half bearing 42 toward the forward side in the rotation direction X of the journal portion 6.

Advantageous Effects

Figure 8:
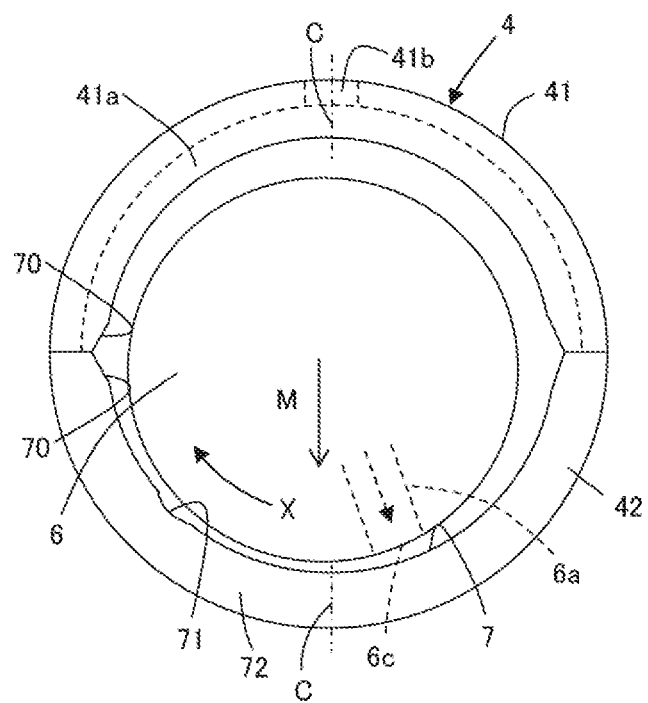
FIG. 8 is a view similar to FIG. 6, for illustrating an action of the main bearing according to the first embodiment of the present invention.

In a four-cycle internal combustion engine, a load on the main bearing 4 is maximized in a combustion stroke. At this point, in the main bearing 4, the journal portion 6 moves in a direction (arrow M) toward the slide surface 7 in the vicinity of the circumferentially central portion C of the lower half bearing 42 on the lower side of the drawing as shown in FIG. 8, and the surface of the journal portion 6 comes closest to the slide surface 7 in the vicinity of the circumferentially central portion C of the lower half bearing 42. Consequently, oil in a clearance (bearing clearance) between the slide surface 7 in the vicinity of the circumferentially central portion C of the lower half bearing 42 and the surface of the journal portion 6 becomes extremely high in pressure under the load.

As shown in FIG. 8, while the entrance opening 6*c* of the lubricating oil path 6*a* of the journal portion 6 is located on a backward side in the rotation direction X of the journal portion 6 relative to the circumferentially central portion C of the lower half bearing 42, the clearance between the slide surface 7 of the lower half bearing 42 and the surface of the journal portion 6 is large. Therefore, the oil in the lubricating oil path 6*a* of the journal portion 6 flows out to the clearance, and the pressure of the oil in the lubricating oil path 6*a* does not become high.

Figure 9:
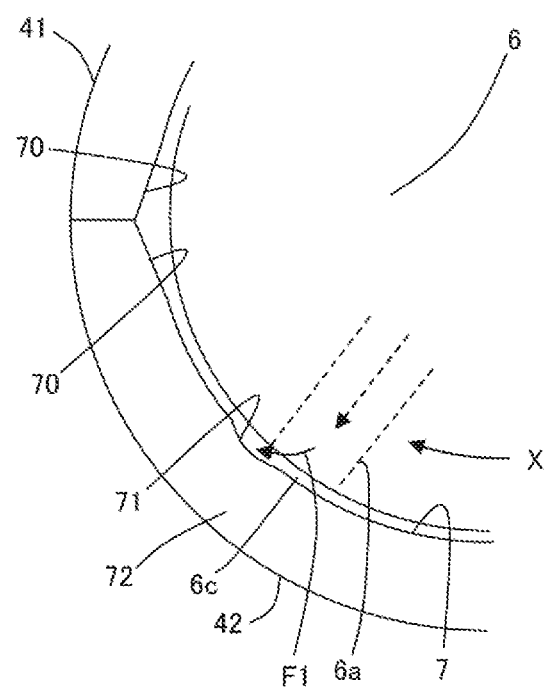
FIG. 9 is a partially enlarged view for illustrating an action of the main bearing according to the first embodiment of the present invention.

According to the present invention, at the moment when communication between the entrance opening 6*c* of the lubricating oil path 6*a* on the outer peripheral surface of the journal portion 6 and the axial groove 71 is then started as shown in FIG. 9, oil flow F1 from the lubricating oil path 6*a* into the axial groove 71 is formed by the difference in pressure between the oil in the lubricating oil path 6a and the oil in a clearance between an inner surface of the axial groove 71 and the surface of the journal portion 6. In this instance, the pressure of oil in the lubricating oil path 6a decreases.

Therefore, according to the present invention, the oil in the lubricating oil path 6a of the journal portion 6 does not become so high in pressure even under the effect by centrifugal force, because the entrance opening 6c of the lubricating oil path 6a of the journal portion 6 is blocked by the slide surface 7 only in a period after passing the circumferentially central portion C of the lower half bearing 42 until communicating with the axial groove 71.

Thus, the difference between the pressure of oil in the lubricating oil path 6a and the pressure of oil in the axial groove 71 does not become so large, and the oil flow F1 does not become too strong. Moreover, even if the oil flow F1 is formed, turbulent flow is not easily generated.

Figure 10:
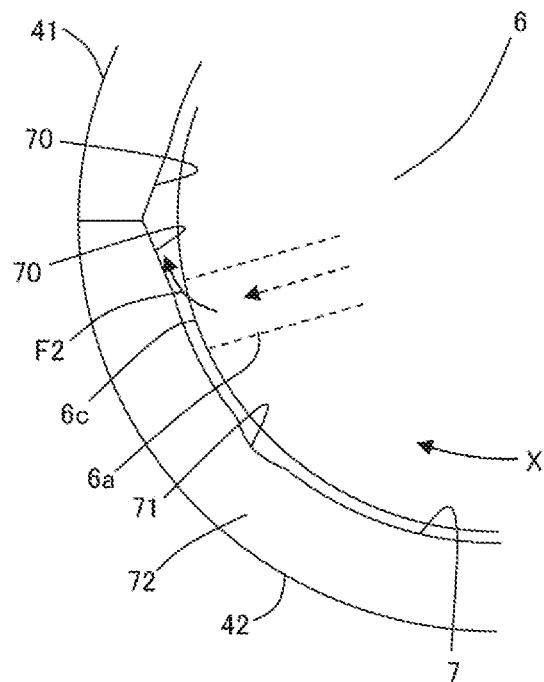
FIG. 10 is a partially enlarged view for illustrating an action of the main bearing according to the first embodiment of the present invention.

As shown in FIG. 10, at the moment when communication between the entrance opening 6c of the lubricating oil path 6a on the outer peripheral surface of the journal portion 6 and the crush relief 70 is started, oil flow F2 from the lubricating oil path 6a into the crush relief is formed by the difference in pressure between the oil in the lubricating oil path 6a and the oil in a clearance (relief clearance) between the crush relief 70 and the surface of the journal portion 6.

However, according to the present invention, the entrance opening 6c of the lubricating oil path 6a of the journal portion 6 and the crush relief 70 (relief clearance) communicate with each other after the pressure of the oil in the lubricating oil path 6a of the journal portion 6 is once reduced by the oil flow F1 into the axial groove 71 shown in FIG. 9. Moreover, an increase in pressure due to the effect by centrifugal force is small because a period in which the entrance opening 6c ends communication with the axial groove 71 and then starts communication with the crush relief 70, that is, a period in which the entrance opening 6c is again blocked by the slide surface 7 is short.

Thus, a pressure difference between the oil in the lubricating oil path 6a and the oil in the relief clearance at the moment when the entrance opening 6c of the lubricating oil path 6a of the journal portion 6 communicates with the crush relief 70 is small, and the oil flow F2 does not become too strong. Moreover, a frictional loss does not become large because turbulent flow is not easily generated even if the oil flow F2 is formed.

According to the present invention, the axial groove 71 is formed on the slide surface 7 within a region apart from the circumferentially central portion C of the lower half bearing 42 toward the forward side in the rotation direction X of the journal portion 6 by a circumferential angle (θ1) of 10° or more, and apart from the crush relief 70 located on the forward side in the rotation direction X of the journal portion 6 toward the circumferentially central portion C of the lower half bearing 42 by a circumferential angle (θ2) of 10° or more.

The axial groove 71 is formed within such a region because a frictional loss is less when the axial groove 71 is apart from the circumferentially central portion C of the lower half bearing 42 toward the forward side in the rotation direction X of the shaft (journal portion 6) by a circumferential angle of 10° or more, than when the axial groove 71 is formed on the slide surface 7 at a circumferential angle of less than 10°. As shown in FIG. 8, the slide surface 7 within a range of a circumferential angle of less than 10° from the circumferentially central portion C of the lower half bearing 42 is subject to a maximum load from the journal portion 6.

If the axial groove 71 is formed within this range, the pressure of oil between the slide surface 7 and the surface of the journal portion 6 decreases, the slide surface 7 and the surface of the journal portion 6 more easily contact each other, and a frictional loss becomes large.

Furthermore, according to the present invention, the axial groove 71 is apart from the crush relief 70 located on the forward side in the rotation direction X of the journal portion 6 toward the circumferentially central portion C of the lower half bearing 42 by a circumferential angle of 10° or more, and therefore a frictional loss becomes small. If the axial groove 71 is formed within a range of a circumferential angle of less than 10° from the crush relief 70 on the forward side of the rotation direction X of the journal portion 6 toward the circumferentially central portion C of the lower half bearing 42, the entrance opening 6c of the lubricating oil path 6a of the journal portion 6 can simultaneously communicate with the axial groove 71 and the crush relief 70. If such communication occurs, the oil in the axial groove 71 is drawn further from the entrance opening 6c via an internal space of the lubricating oil path 6a in the vicinity of the entrance opening 6c by the oil flow F2 flowing into the relief clearance and then flows into the relief clearance because the pressure of oil in the relief clearance is lower than the pressure of oil in the axial groove 71. Accordingly, the oil in the clearance between the slide surface 7 and the surface of the journal portion 6 around the axial groove 71 flows into the axial groove 71, the slide surface 7 adjacent to the axial groove 71 directly contacts the surface of the journal portion 6, and a frictional loss becomes large.

Moreover, when the axial groove 71 is apart from the crush relief 70 located on the forward side in the rotation direction of the journal portion 6 toward the circumferentially central portion C of the lower half bearing 42 by a circumferential angle of 10° or more, foreign matters contained in the oil in the lubricating oil path 6a of the journal portion 6, if any, are not easily discharged into the axial groove 71, and it is therefore difficult for the foreign matters to be embedded or accumulated in the inner surface of the axial groove 71. This is because, as shown in FIG. 8, the clearance between the surface of the journal portion 6 and the slide surface 7 of the lower half bearing 42 becomes smaller as it is closer to the circumferentially central portion C of the lower half bearing 42. That is, the clearance is larger on a closer side to a circumferential end side, but if the axial groove 71 is apart from the crush relief 70 toward the circumferentially central portion C of the lower half bearing 42 by a circumferential angle of 10° or more, the clearance between the slide surface 7 as well as the inner surface of the axial groove 71, and the surface of the journal portion 6 becomes narrow, and the foreign matters in the lubricating oil path 6a do not easily flow out to the axial groove 71. It is preferable that the axial groove 71 is apart from the crush relief 70 located on the forward side in the rotation direction of the journal portion 6 toward the circumferentially central portion C of the lower half bearing 42 by a circumferential angle of 10° or more, so that it becomes more difficult for the foreign matters contained in the lubricating oil path 6a of the journal portion 6 to flow out to the axial groove 71.

It should be noted that, in Embodiment 1, only the lower half bearing 42 of the pair of half bearings constituting the main bearing 4 has the axial groove 71, and the upper half bearing 41 does not have an axial groove 71. As described above, the upper half bearing 41 has the oil groove 41a on the slide surface 7, and therefore if the upper half bearing 41 has the axial groove 71, the oil groove 41a communicates with the axial groove 71, and the oil supplied into the oil groove 41a from the outside of the main bearing 4 will flow into the axial groove 71. Thus, the amount of oil supplied to the connecting rod bearing 3 and the crankpin 5 from the oil groove 41a via the lubricating oil path 6a of the journal portion 6 decreases.

Embodiment 2

Figure 11:
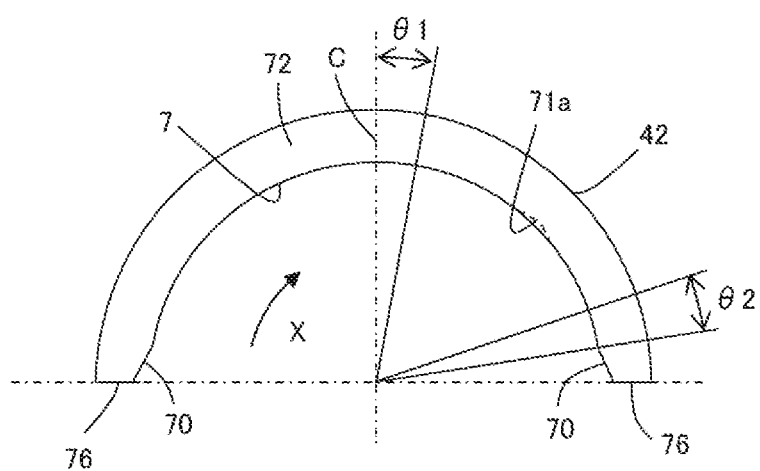
FIG. 11 is a view in which a lower half bearing of a main bearing according to a second embodiment of the present invention is seen from an axial direction.
Figure 12:
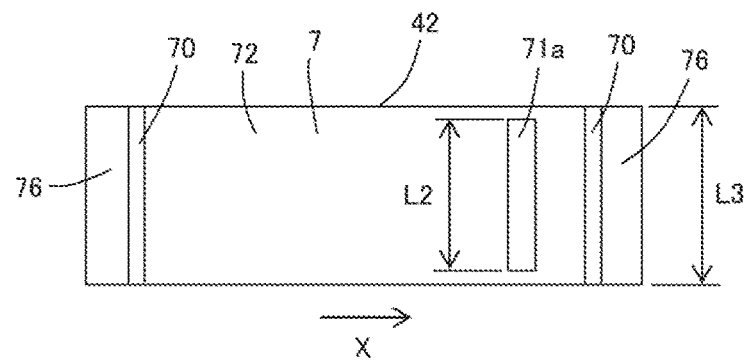
FIG. 12 is a plan view in which the half bearing shown in FIG. 11 is seen from a slide surface side.

As shown in FIG. 11 and FIG. 12, differently from the lower half bearing 42 according to Embodiment 1, an axial groove 71a according to Embodiment 2 is formed so as not to open at an axial end of the lower half bearing 42. Other configurations according to Embodiment 2 are the same as the configurations of the upper half bearing 41 and the lower half bearing 42 according to Embodiment 1.

The axial groove 71a is formed so that the center of an axial length L2 corresponds to the center of an axial length L3 of the lower half bearing 42.

It is preferable that the axial groove 71a is formed so that the axial length L2 is 70 to 95% of the axial length L3 of the lower half bearing 42.

Advantageous Effects

The present embodiment has advantageous effects similar to those of Embodiment 1. Moreover, the axial groove 71a is not open at either axial end of the lower half bearing 42. Therefore, it is more difficult for oil in the axial groove 71a to flow outside the bearing than Embodiment 1.

It should be noted that the axial groove 71a may be formed so as to open at one axial end of the lower half bearing 42 and not to open at the other end.

Embodiment 3

Figure 13:
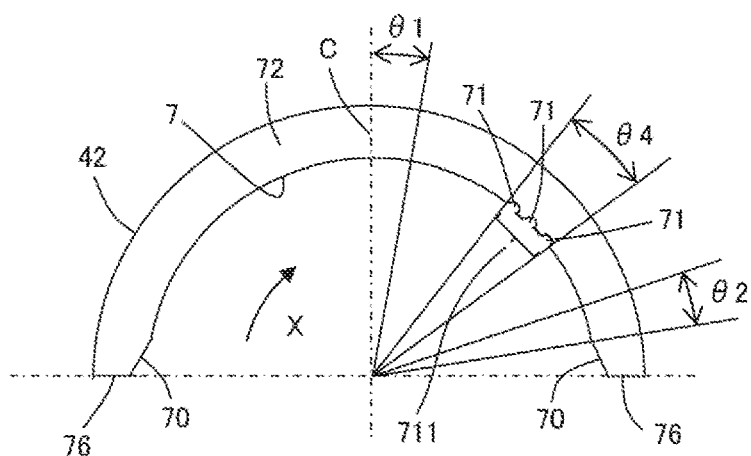
FIG. 13 is a view in which a lower half bearing of a main bearing according to a third embodiment of the present invention is seen from an axial direction.
Figure 14:
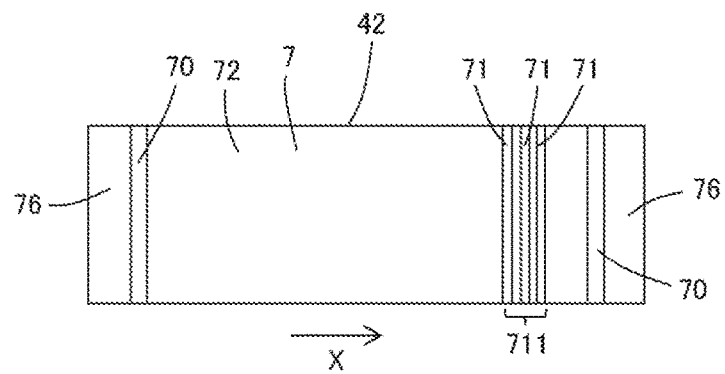
FIG. 14 is a plan view in which the half bearing shown in FIG. 13 is seen from a slide surface side.
Figure 15:
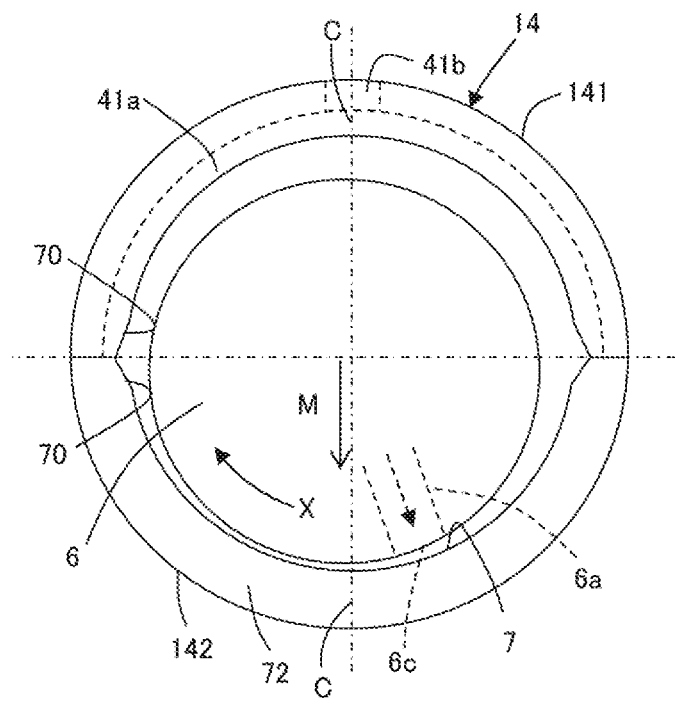
FIG. 15 is a view for illustrating an action of a main bearing according to a prior art.
Figure 16:
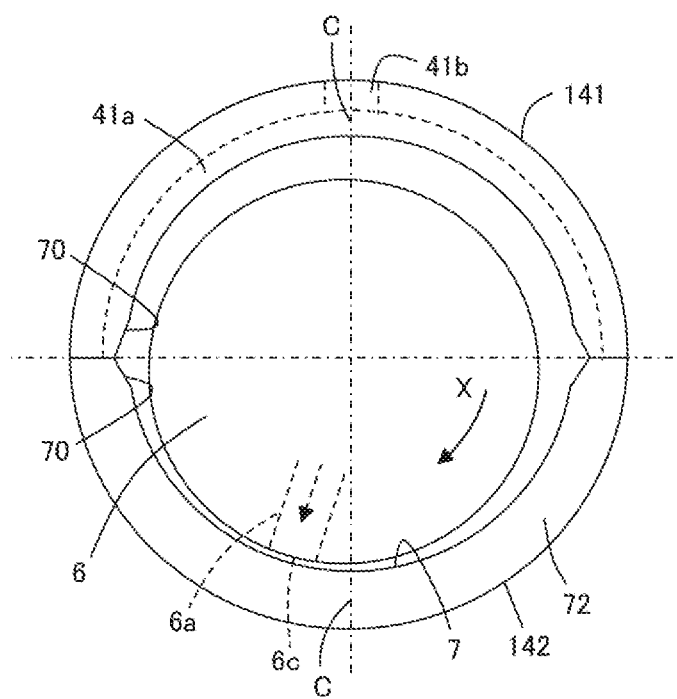
FIG. 16 is a view for illustrating an action of the main bearing according to the prior art.
Figure 17:
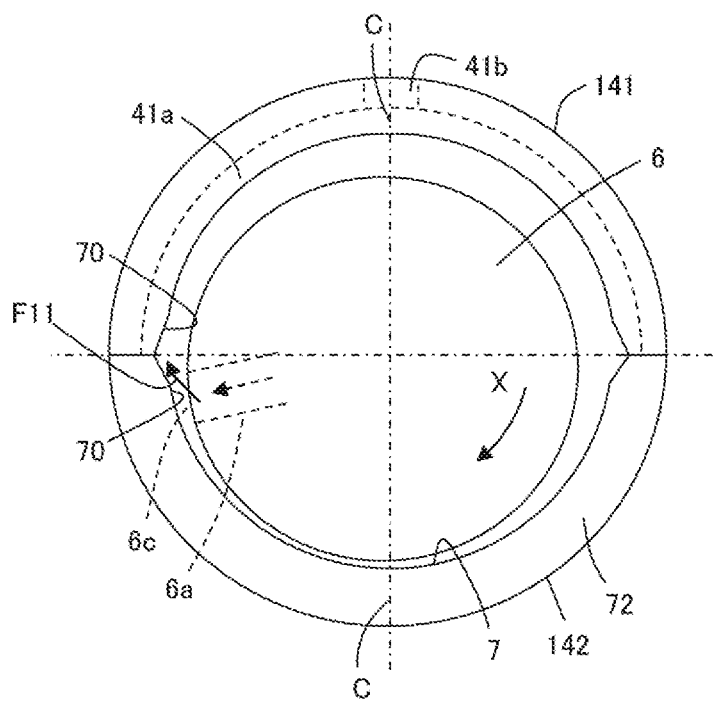
FIG. 17 is a view for illustrating an action of the main bearing according to the prior art.
Figure 18:
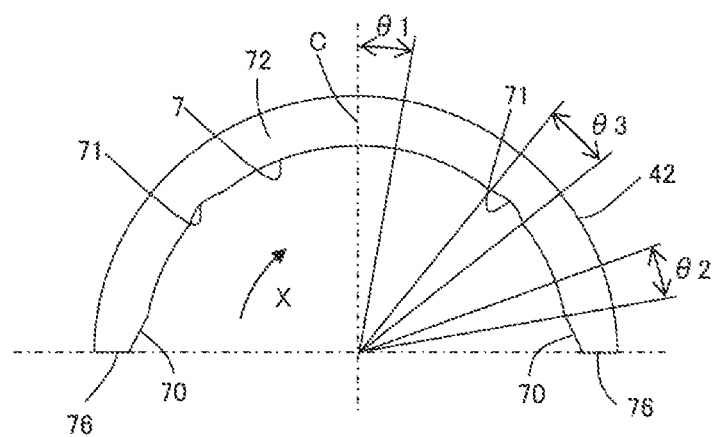
FIG. 18 is a view in which a lower half bearing according to another embodiment of the present invention is seen from an axial direction.
Figure 19:
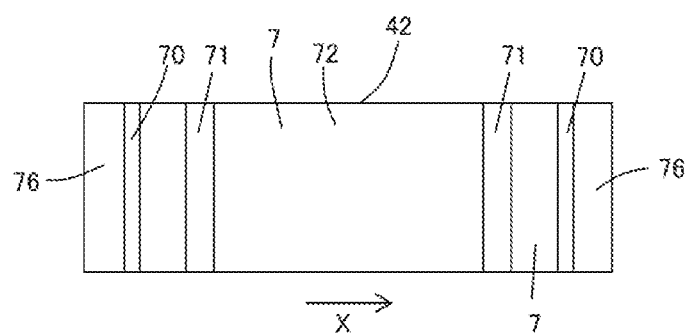
FIG. 19 is a plan view in which the half bearing shown in FIG. 18 is seen from a slide surface side.
Figure 20:
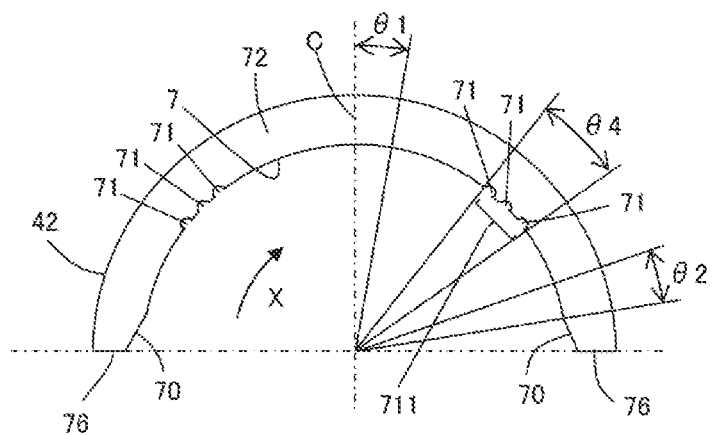
FIG. 20 is a view in which a lower half bearing of a main bearing according to another embodiment of the present invention is seen from an axial direction.
Figure 21:
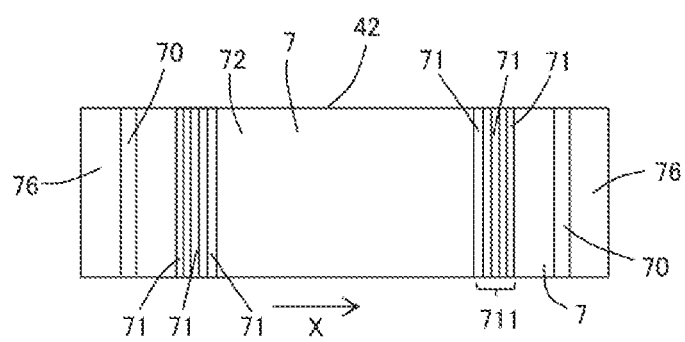
FIG. 21 is a plan view in which the half bearing shown in FIG. 20 is seen from a slide surface side.

As shown in FIG. 13 and FIG. 14, differently from the lower half bearings according to Embodiments 1 and 2, a lower half bearing 42 according to Embodiment 3 has a plurality of (three) axial grooves 71 on the slide surface 7 of the main cylindrical portion 72 between the circumferentially central portion C of the lower half bearing 42 and the crush relief 70 located on the forward side in the rotation direction of the journal portion 6.

These axial grooves 71 are also formed on the slide surface 7 in a region apart from the circumferentially central portion C of the lower half bearing 42 by a circumferential angle (θ1) of 10° or more, and apart from the crush relief 70 located on the forward side in the rotation direction of the journal portion 6 toward the circumferentially central portion C by a circumferential angle (θ2) of 10° or more.

Other configurations according to Embodiment 3 are the same as those of the upper half bearing 41 and the lower half bearing 42 according to Embodiment 1.

When the present invention is applied to a main bearing for a crankshaft of an internal combustion engine of a general passenger vehicle, that is, a main bearing for a crankshaft in which the diameter of a journal portion 6 is approximately 40 mm to 100 mm, the plurality of axial grooves 71 are preferably arranged so as to be apart from each other by 0.5 to 2 mm in the circumferential direction on the slide surface 7 of the lower half bearing 42. Moreover, the plurality of axial grooves 71 preferably have the same circumferential length L1 and the same depth D1.

Furthermore, the circumferential length of an axial groove formed region 711 on the slide surface 7 that is composed of the plurality of axial grooves 71 and slide surfaces between the axial grooves 71 is preferably a length equivalent to a circumferential angle (θ4) of 5 to 35° on the slide surface 7 of the lower half bearing 42.

In the present embodiment, the lower half bearing 42 has three axial grooves 71, but is not limited thereto and may have two, or four or more axial grooves 71.

Moreover, the plurality of axial grooves 71 do not need to open at both axial ends of the lower half bearing 42, as in Embodiment 2.

Advantageous Effects

The present embodiment has advantageous effects similar to those in Embodiment 1. Moreover, since a slide surface 7 is provided between the plurality of axial grooves 71, the present embodiment has the ability to bear the journal portion 6 by the slide surface even in the region (axial groove formed region) where the plurality of axial grooves 71 are formed.

It should be noted that, in Embodiments 1 to 3, an axial groove similar to the axial groove 71 may also be formed on the slide surface 7 between the circumferentially central portion C of the lower half bearing 42 and the crush relief 70 located on the backward side in the rotation direction of the journal portion 6 so that the lower half bearing 42 has a shape symmetrically with respect to the circumferentially central portion C, as illustrated in FIGS. 18-21.

By employing such a symmetrical shape, wrong mounting of the lower half bearing 42 in the bearing cap 82 of the cylinder block bottom part 8 can be prevented.

The lower half bearing constituting the main bearing according to the present invention described above may have, on the inner peripheral side thereof, a partial groove which communicates with the oil groove 41a of the upper half bearing 41 at the circumferential end surfaces. However, it is preferable that the partial groove is formed to be apart from the axial groove 71 by a circumferential angle of 10° or more.

The invention claimed is:

1. A main bearing for rotatably supporting a journal portion of a crankshaft of an internal combustion engine, the journal portion comprising a cylindrical barrel portion, a lubricating oil path extending through the cylindrical barrel portion, and at least one entrance opening of the lubricating oil path formed on an outer peripheral surface of the cylindrical barrel portion, wherein the main bearing comprises an upper half bearing and a lower half bearing which are combined with each other to form a cylindrical shape, each of the upper half bearing and the lower half bearing comprises a main cylindrical portion including a circumferentially central portion of each of the upper half bearing and the lower half bearing, the main cylindrical portion comprises a slide surface on a radially inner side thereof, and each of the upper half bearing and the lower half bearing comprises crush reliefs formed on both circumferential sides of the slide surface so that a wall thickness at the crush relief is smaller than that of the main cylindrical portion, and only the upper half bearing comprises an oil groove formed on an inner peripheral surface thereof and extending in a circumferential direction, and at least one oil hole extending from the oil groove to an outer peripheral surface of the upper half bearing through the upper half bearing, and wherein the lower half bearing comprises an axial groove extending on the slide surface in an axial direction between the circumferentially central portion and the crush relief located on a forward side in a rotation direction of the journal portion, and the axial groove is apart from the circumferentially central portion toward the forward side in the rotation direction by a circumferential angle of 10° or more, and apart from the crush relief located on the forward side in the rotation direction of the journal portion by a circumferential angle of 10° or more.

2. The main bearing according to claim 1, wherein a depth (D1) of the axial groove measured from the slide surface in a radial direction is 0.5 to 30 μm.

3. The main bearing according to claim 1, wherein the axial groove has a circumferential length corresponding to a circumferential angle (θ3) of 1 to 35°.

4. The main bearing according to claim 1, wherein the axial groove opens at both axial ends of the lower half bearing.

5. The main bearing according to claim 1, wherein the axial groove does not open at either axial end of the lower half bearing.

6. The main bearing according to claim 1, wherein the lower half bearing comprises a further axial groove formed on the slide surface between the circumferentially central portion and the crush relief located on a backward side in the rotation direction of the journal portion to be symmetrical to said axial groove with respect to the circumferentially central portion.

7. The main bearing according to claim 1, wherein the lower half bearing comprises a plurality of said axial grooves, which are formed within a circumferential range corresponding to a circumferential angle (θ4) of 5 to 35°.

8. The main bearing according to claim 7, wherein the lower half bearing comprises a further plurality of axial grooves formed on the slide surface between the circumferentially central portion and the crush relief located on a backward side in the rotation direction of the journal portion to be symmetrical to said axial grooves with respect to the circumferentially central portion.

* * * * *